US012771112B2

(12) United States Patent
Okada et al.

(10) Patent No.: US 12,771,112 B2
(45) Date of Patent: Oct. 20, 2026

(54) OVERCURRENT PROTECTION CIRCUIT AND POWER SUPPLY DEVICE

(71) Applicant: ROHM CO., LTD., Kyoto (JP)

(72) Inventors: Tatsuya Okada, Kyoto (JP); Atsuhiro Watanabe, Kyoto (JP); Toyokazu Katsumi, Kyoto (JP); Shinji Takizawa, Kyoto (JP); Daisaku Shugo, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 148 days.

(21) Appl. No.: 18/641,740

(22) Filed: Apr. 22, 2024

(65) Prior Publication Data

US 2024/0275160 A1 Aug. 15, 2024

Related U.S. Application Data

(63) Continuation of application No. PCT/JP2022/037106, filed on Oct. 4, 2022.

(30) Foreign Application Priority Data

Nov. 12, 2021 (JP) ................................. 2021-185085

(51) Int. Cl.
*H02H 3/08* (2006.01)

(52) U.S. Cl.
CPC .................................... *H02H 3/08* (2013.01)

(58) Field of Classification Search
CPC . H02H 3/08; H02H 7/205; H02H 9/02; B60R 16/03; H02M 1/32; H03K 17/082; H03K 17/0822; G05F 1/573; G05F 1/56
USPC ................................................ 361/93.7–93.9
See application file for complete search history.

(56) References Cited

U.S. PATENT DOCUMENTS

2010/0213908 A1* 8/2010 Chen ..................... G05F 1/5735 323/281
2013/0234687 A1* 9/2013 Fujimura ................ G05F 1/575 323/282
2014/0029141 A1* 1/2014 Yahagi .................... G05F 1/573 361/18

(Continued)

FOREIGN PATENT DOCUMENTS

JP 2006-115646 4/2006

OTHER PUBLICATIONS

International Search Report and Written Opinion in International Appln. No. PCT/JP2022/037106, mailed on Nov. 29, 2022, 13 pages (with machine translation).

(Continued)

*Primary Examiner* — Danny Nguyen
(74) *Attorney, Agent, or Firm* — Fish & Richardson P.C.

(57) ABSTRACT

An overcurrent protection circuit includes a first mirror transistor configured to be driven by a first drive signal, common to a first output transistor, so as to pass a first mirror current, a second mirror transistor configured to be driven by a second drive signal so as to pass a second mirror current, a resistor configured to be connected between a control terminal of each of the first output transistor and the first mirror transistor and a control terminal of the second mirror transistor, and a current restriction unit configured to control the first drive signal such that a sense current, which is a total of the first mirror current and the second mirror current, is restricted to values equal to or less than a predetermined upper limit value.

10 Claims, 7 Drawing Sheets

(56) References Cited

U.S. PATENT DOCUMENTS

| | | | | |
|---|---|---|---|---|
| 2014/0184182 | A1* | 7/2014 | Yajima | G05F 1/573<br>323/273 |
| 2018/0287485 | A1* | 10/2018 | Sakaguchi | H02M 1/08 |
| 2019/0279977 | A1* | 9/2019 | Ma | H10D 89/815 |
| 2022/0190815 | A1* | 6/2022 | Sakaguchi | H03K 17/0822 |

OTHER PUBLICATIONS

CN OA—The State Intellectual Property Office of People's Republic of China, Office Action in Chinese Appln. No. 202280074658.X, dated May 21, 2026, 10 pages (with English Translation).
JP OA—Japanese Patent Office, Office Action in Japanese Appln. No. 2023-559472, dated Jul. 21, 2026, 4 pages (with English Translation).

* cited by examiner

OVERCURRENT PROTECTION CIRCUIT AND POWER SUPPLY DEVICE

CROSS-REFERENCE TO RELATED APPLICATIONS

This nonprovisional application is a continuation application of International Patent Application No. PCT/JP2022/037106 filed on Oct. 4, 2022, which claims priority Japanese Patent Application No. 2021-185085 filed on Nov. 12, 2021, the entire contents of which are hereby incorporated by reference.

TECHNICAL FIELD

The disclosure herein relates to an overcurrent protection circuit and a power supply device.

BACKGROUND ART

Conventionally, overcurrent protection circuits have widely been in practical use as one of abnormality protection means.

An example of conventional technologies related to the above is disclosed in Patent Document 1 identified below.

CITATION LIST

Patent Literature

Patent Document 1: Japanese Unexamined Patent Application Publication No. 2006-115646

DESCRIPTION OF EMBODIMENTS

Power Supply Device (Comparative Example)

Figure 1:
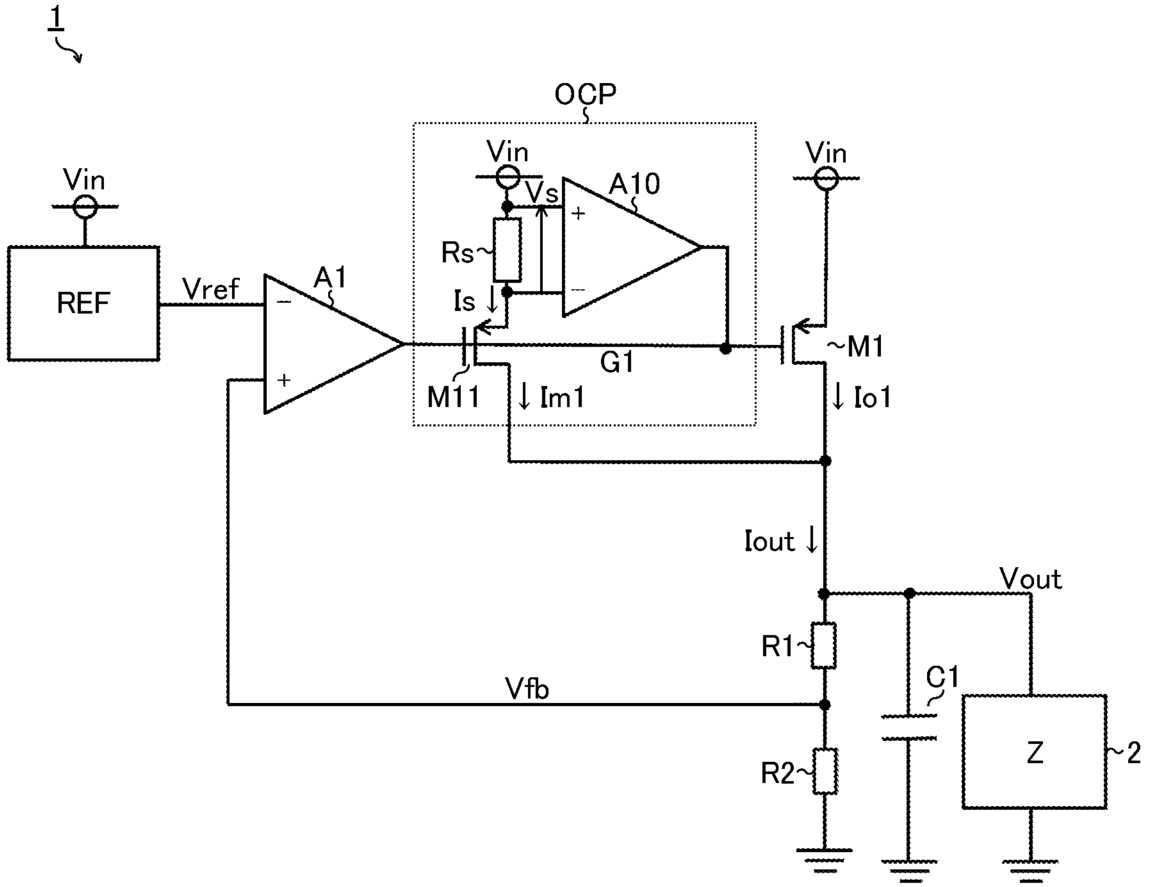
FIG. 1 is a diagram showing a power supply device according to a comparative example.

FIG. 1 is a diagram illustrating a power supply device according to a comparative example (having a common configuration to be compared with embodiments described later). A power supply device 1 of the comparative example is an LDO [low drop-out] regulator (a kind of linear regulator) that generates an output voltage Vout (≤Vin) from an input voltage Vin to supply the output voltage Vout to a load 2, and includes an output transistor M1 (in the figure, a PMOSFET [P-channel type metal oxide semiconductor field effect transistor]), a reference voltage generation circuit REF, an error amplifier A1, resistors R1 and R2, a capacitor C1, and an overcurrent protection circuit OCP.

The output transistor M1 corresponds to a first output transistor that is connected between an input terminal for the input voltage Vin and an output terminal for the output voltage Vout so as to be driven by a gate drive signal G1.

A source of the output transistor M1 is connected to the input terminal for the input voltage Vin. A drain of the output transistor M1 is connected to the output terminal for the output voltage Vout. A gate of the output transistor M1 is connected to an application terminal for the gate drive signal G1 (=corresponding to a first drive signal). An on-resistance Ron1 of the output transistor M1 is variably controlled in accordance with the gate drive signal G1.

The higher the gate drive signal G1 is, the lower a gate-source voltage Vgs1 of the output transistor M1 becomes. Thus, the on-resistance Ron1 of the output transistor M1 increases, and thus an output current Io1 flowing through the output transistor M1 (and thus an output current Iout flowing through the load 2) decreases. On the other hand, the lower the gate drive signal G1 is, the higher the gate-source voltage Vgs1 of the output transistor M1 becomes. Thus, the on-resistance Ron1 of the output transistor M1 decreases, and thus the output current Io1 flowing through the output transistor M1 increases.

The resistors R1 and R2 are connected in series between the output terminal for the output voltage Vout and a ground terminal. The resistors R1 and R2 function as a voltage dividing circuit that outputs from a connection node therebetween a feedback voltage Vfb (={R2/(R1+R2)}×Vout) in accordance with the output voltage Vout. Note that, in a case where the output voltage Vout stays within an input dynamic range of the error amplifier A1, the resistors R1 and R2 may be omitted such that the output voltage Vout is directly fed to the error amplifier A1.

The capacitor C1 is connected in series between the output terminal for the output voltage Vout and the ground terminal. The capacitor C1 functions as smoothing means for the output voltage Vout.

The reference voltage generation circuit REF generates a predetermined reference voltage Vref from the input voltage Vin. Preferably usable as the reference voltage generation circuit REF is, for example, a bandgap reference voltage supply or the like having flat input voltage dependence and temperature dependence.

The error amplifier A1 generates an error signal between the feedback voltage Vfb fed to a non-inverting input terminal (+) thereof and the reference voltage Vref fed to an inverting input terminal (−) thereof, and outputs the error signal as the gate drive signal G1. Thus, the gate drive signal G1 lowers when the feedback voltage Vfb is lower than the reference voltage Vref, and rises when the feedback voltage Vfb is higher than the reference voltage Vref. Note that the error amplifier A1 can be understood as an example of an output feedback circuit configured to accept an input of the output voltage Vout or the feedback voltage Vfb in accordance with the output voltage Vout to generate the gate drive signal G1 of the output transistor M1.

The overcurrent protection circuit OCP restricts the output current Io1 flowing through the output transistor M1 (and thus the output current Iout flowing through the load 2) to values equal to or less than a predetermined upper limit value.

Note that, among the components described above, the output transistor M1, the reference voltage generation circuit REF, the error amplifier A1, the resistors R1 and R2, and the overcurrent protection circuit OCP may be integrated into a semiconductor integrated circuit device (what is called a power supply control IC). However, the output transistor M1 and the resistors R1 and R2 may be externally attached to the semiconductor integrated circuit device.

Overcurrent Protection Circuit

Next, with reference to FIG. 1, a description will be given of a configuration and operation of the overcurrent protection circuit OCP. The overcurrent protection circuit OCP includes a mirror transistor M11 (a PMOSFET in the figure), a sense resistor Rs, and an operational amplifier A10.

The mirror transistor M11 corresponds to a first mirror transistor that is driven by the gate drive signal G1 common to the output transistor M1 so as to pass a mirror current Im1 that behaves similarly to the output current Io1 in terms of increase and decrease.

A source of the mirror transistor M11 is connected via the sense resistor Rs to the input terminal for the input voltage Vin. A drain of the mirror transistor M11 is connected to the output terminal for the output voltage Vout. A gate of the mirror transistor M11 is connected to the application terminal for the gate drive signal G1. An on-resistance Ron11 of the mirror transistor M11 is variably controlled in accordance with the gate drive signal G1.

For example, the higher the gate drive signal G1 is, the lower a gate-source voltage Vgs11 of the mirror transistor M11 becomes. Thus, the on-resistance Ron11 of the mirror transistor M11 increases, and thus the mirror current Im1 (=corresponding to a first mirror current) flowing through the mirror transistor M11 decreases. On the other hand, the lower the gate drive signal G1 is, the higher the gate-source voltage Vgs11 of the mirror transistor M11 becomes. Thus, the on-resistance Ron11 of the mirror transistor M11 decreases, and thus the mirror current Im1 flowing through the mirror transistor M11 increases.

The mirror transistor M11 is smaller in size than the output transistor M1. Thus, the mirror current Im1 is smaller than the output current Io1.

The sense resistor Rs functions as a current/voltage conversion element that converts a sense current Is (=the mirror current Im1) flowing therethrough into a sense voltage Vs (=Is×Rs). A first end (=a high-potential end) of the sense resistor Rs is connected to a non-inverting input terminal (+) of the operational amplifier A10. A second end (=a low-potential end) of the sense resistor Rs is connected to an inverting input terminal (−) of the operational amplifier A10.

The operational amplifier A10 regulates the gate drive signal G1 in accordance with a difference between the sense voltage Vs, which appears across the sense resistor Rs, and an internal offset voltage Vofs (=corresponding to an overcurrent detection threshold) of the operational amplifier A10.

For example, when the sense voltage Vs is lower than the internal offset voltage Vofs, the operational amplifier A10 enters an output high-impedance state. In this state, no restriction is put on the gate drive signal G1. Thus, the on-resistance Ron1 of the output transistor M1 is not lowered, or the output current Io1 is not restricted.

On the other hand, when the sense voltage Vs is higher than the internal offset voltage Vofs, the operational amplifier A10 enters a state where the operational amplifier A10 raises the gate drive signal G1 in accordance with the difference between them (=Vs−Vofs). When the gate drive signal G1 is raised, the on-resistance Ron1 of the output transistor M1 decreases, and thus the output current Io1 decreases.

Further, when the gate drive signal G1 is raised, the on-resistance Ron11 of the mirror transistor M11 lowers, and thus the mirror current Im1 (and thus the sense current Is) decreases. Thus, the difference between the sense voltage Vs and the internal offset voltage Vofs decreases, and a raising amount by which the operational amplifier A10 raises the gate drive signal G1 decreases.

As a result of the series of gate drive control described above, the sense voltage Vs and the internal offset voltage Vofs eventually reach an equilibrium state where they are equal to each other. This state is the very state where the sense current Is (and thus the output current Io1) is restricted to values equal to or less than the predetermined upper limit value.

In this manner, the sense resistor Rs and the operational amplifier A10 function as a current restriction portion that controls the gate drive signal G1 such that the sense current Is is restricted to values equal to or less than the predetermined upper limit value.

Consideration on Peak Current and Load Response Characteristics

However, in the power supply device 1 of the comparative example described above, operation timing of the overcurrent protection circuit OCP (=start-up timing of the overcurrent protection operation) is uniquely determined. This makes it difficult to suppress peak current while improving load variation characteristics.

In what follows, in view of the above discussion, a new embodiment will be proposed that is capable of suppressing peak current while improving load response characteristics.

Power Supply Device (First Embodiment)

Figure 2:
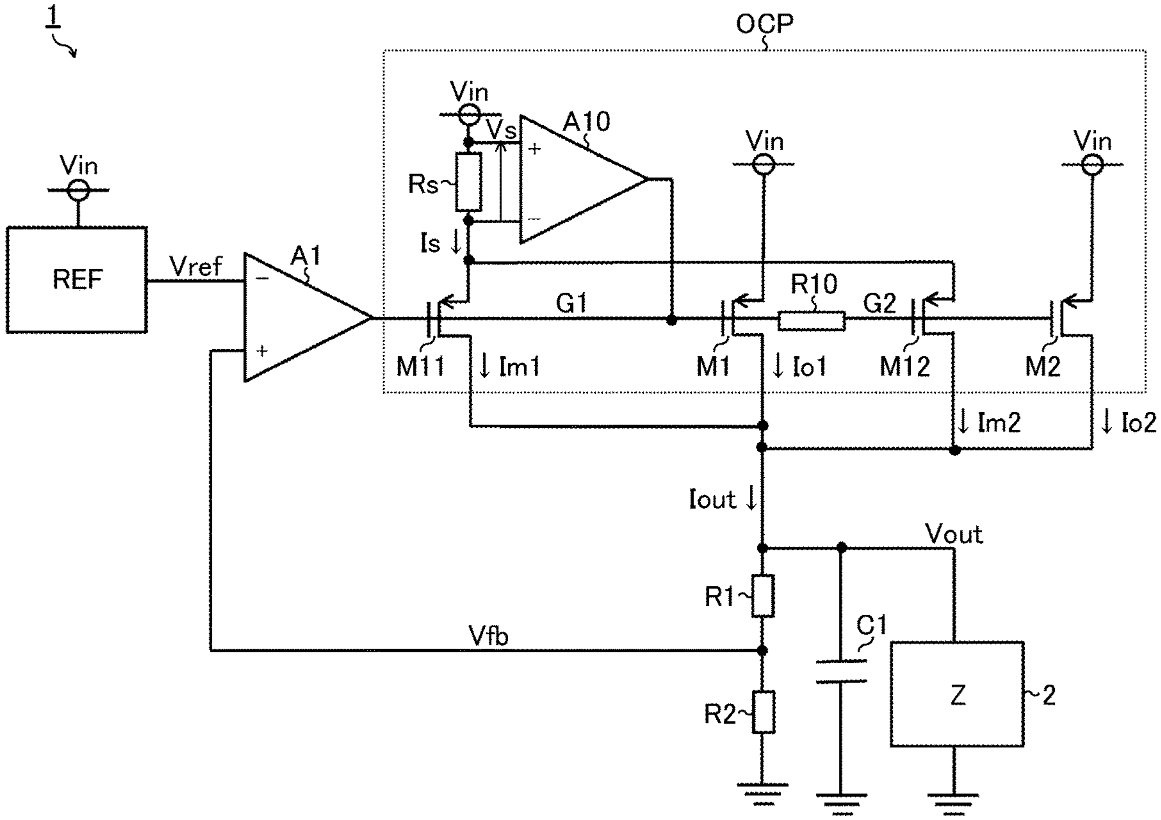
FIG. 2 is a diagram illustrating a power supply device according to a first embodiment.

FIG. 2 is a diagram illustrating a power supply device 1 according to a first embodiment. The power supply device 1 of the present embodiment basically has the same configuration as the previously described comparative example (FIG. 1), but further includes an output transistor M2 (e.g., a PMOSFET), a mirror transistor M12 (e.g., a PMOSFET), and a resistor R10. Note that, of the above components, the mirror transistor M12 and the resistor R10 can be understood as components forming the overcurrent protection circuit OCP.

Note also that, in the following description, a current flowing through the output transistor M1 will be denoted as output current Io1, a current flowing through the output transistor M2 will be denoted as output current Io2, and a current flowing through the load 2 will be denoted as output current Iout (≈Io1+Io2). Further, a current flowing through the mirror transistor M11 will be denoted as mirror current Im1, and a current flowing through the mirror transistor M12 will be denoted as mirror current Im2.

The output transistor M2 corresponds to a second output transistor that is connected between the input terminal for the input voltage Vin and the output terminal for the output voltage Vout so as to be driven by a gate drive signal G2.

A source of the output transistor M2 is connected to the input terminal for the input voltage Vin. A drain of the output transistor M2 is connected to the output terminal for the output voltage Vout. A gate of the output transistor M2 is connected to an application terminal for the gate drive signal G2 (=corresponding to a second drive signal). An on-resistance Ron2 of the output transistor M2 is variably controlled in accordance with the gate drive signal G2.

The higher the gate drive signal G2 is, the lower a gate-source voltage Vgs2 of the output transistor M2 becomes. Accordingly, the on-resistance Ron2 of the output transistor M2 increases, and thus the output current Io2 flowing through the output transistor M2 decreases. On the other hand, the lower the gate drive signal G2 is, the higher the gate-source voltage Vgs2 of the output transistor M2 becomes. Accordingly, the on-resistance Ron2 of the output transistor M2 decreases, and thus the output current Io2 flowing through the output transistor M2 increases.

In this manner, in the power supply device 1 of the present embodiment, the output transistor is divided into a plurality of output transistors (the two output transistors M1 and M2 in the present figure). Moreover, operation timings of the output transistors M1 and M2 are shifted from each other by the resistor R10.

Referring to the present figure, rising and falling of the gate drive signal G2 are delayed compared to those of the gate drive signal G1. Accordingly, the output transistor M2 operates with a delay compared to the output transistor M1. As a result, increase and decrease of the output current Io2 are delayed compared to those of the output current Io1.

In this manner, by creating a difference in transient response characteristics between the output transistors M1 and M2, it is possible to regulate phase characteristics of the power supply device 1 as necessary in accordance with a size ratio between the output transistors M1 and M2.

For example, the output transistor M2 may be designed to be larger in size than the output transistor M1. Specifically, the size ratio between the output transistors M1 and M2 may be 1:2.

The mirror transistor M12 corresponds to a first mirror transistor that is driven by the gate drive signal G2, common to the output transistor M2, so as to pass the mirror current Im2 that behaves similarly to the output current Io2 in terms of increase and decrease.

A source of the mirror transistor M12 is connected to the source of the mirror transistor M11. A drain of the mirror transistor M12 is connected to the output terminal for the output voltage Vout. A gate of the mirror transistor M12 is connected to an application terminal for the gate drive signal G2. An on-resistance Ron12 of the mirror transistor M12 is variably controlled in accordance with the gate drive signal G2.

For example, the higher the gate drive signal G2 is, the lower a gate-source voltage Vgs12 of the mirror transistor M12 becomes. Accordingly, the on-resistance Ron12 of the mirror transistor M12 increases, and thus the mirror current Im2 flowing through the mirror transistor M12 (=corresponding to the second mirror current) decreases. On the other hand, the lower the gate drive signal G2 is, the higher the gate-source voltage Vgs12 of the mirror transistor M12 becomes. Accordingly, the on-resistance Ron12 of the mirror transistor M12 decreases, and thus the mirror current Im2 flowing through the mirror transistor M12 increases.

The mirror transistor M12 is smaller in size than the output transistors M1 and M2. Accordingly, the mirror current Im2 is smaller than the output currents Io1 and Io2.

The resistor R10 is connected between the gates of the output transistor M1 and the mirror transistor M11 (=the application terminal for the gate drive signal G1) and the gates of the output transistor M2 and the mirror transistor M12 (=the application terminal for the gate drive signal G2). A resistance value of the resistor R10 may be set to several tens to several hundreds kΩ (e.g., 250 kΩ).

The overcurrent protection circuit OCP (in particular, an overcurrent restriction unit formed of the sense resistor Rs and the operational amplifier A10) controls the gate drive signal G1 such that the sense current Is (=Im1+Im2) which is a total of the mirror currents Im1 and Im2 is restricted to values equal to or less than the predetermined upper limit value.

In this manner, in the power supply device 1 of the present embodiment, the mirror transistor of the overcurrent protection circuit OCP is divided in a plurality of mirror transistors (the two mirror transistors M11 and M12 in the present figure). Moreover, operation timings of the mirror transistors M11 and M12 are shifted from each other by the resistor R10.

Referring to the present figure, rising and falling of the gate drive signal G2 are delayed compared to those of the gate drive signal G1. Accordingly, the mirror transistor M12 operates with a delay compared to the mirror transistor M11. As a result, increase and decrease of the mirror current Im2 are delayed compared to those of the mirror current Im1.

In this manner, by creating a difference in transient response characteristics between the mirror transistors M11 and M12, it is possible to regulate operation timing of the overcurrent protection circuit OCP (=start-up timing of the overcurrent protection operation) as necessary in accordance with a size ratio between the mirror transistors M11 and M12. This makes it possible to suppress peak current while improving load variation characteristics.

Figure 3:
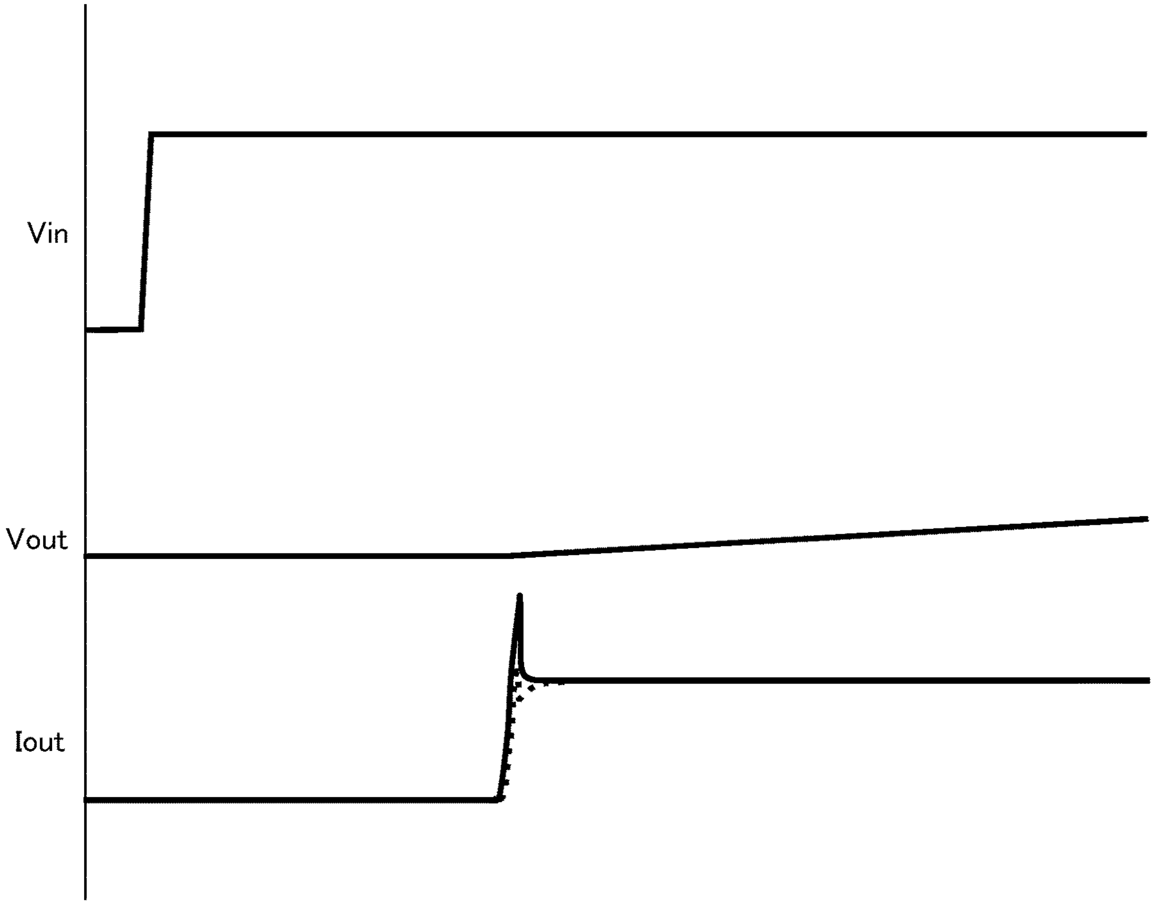
FIG. 3 is a diagram illustrating a behavior of peak current upon startup.

FIG. 3 is a diagram illustrating a behavior of a peak current (=a rush current flowing into the capacitor C1) upon startup of the power supply device 1, and in the figure, the input voltage Vin, the output voltage Vout, and the output current Iout are depicted in order from the top.

Note that a solid line of the output current Iout indicates a behavior of the output current Iout when a mirror current ratio Im1/Im2=2/1. On the other hand, a dotted line of the output current Iout indicates a behavior of the output current Iout when the mirror current ratio Im1/Im2=1/2.

The mirror current ratio Im1/Im2 described above is a ratio between the mirror currents Im1 and Im2 respectively flowing through the mirror transistors M11 and M12 in a steady state of the power supply device 1. That is, the mirror current ratio Im1/Im2 may be understood as a size ratio between the mirror transistors M11 and M12.

As is clear from comparison between the solid line and the dotted line of the output current Iout, in the power supply device 1 of the present embodiment, by regulating the mirror current ratio Im1/Im2, it is possible to suppress transient peak current at the startup of the power supply device 1.

Figure 4:
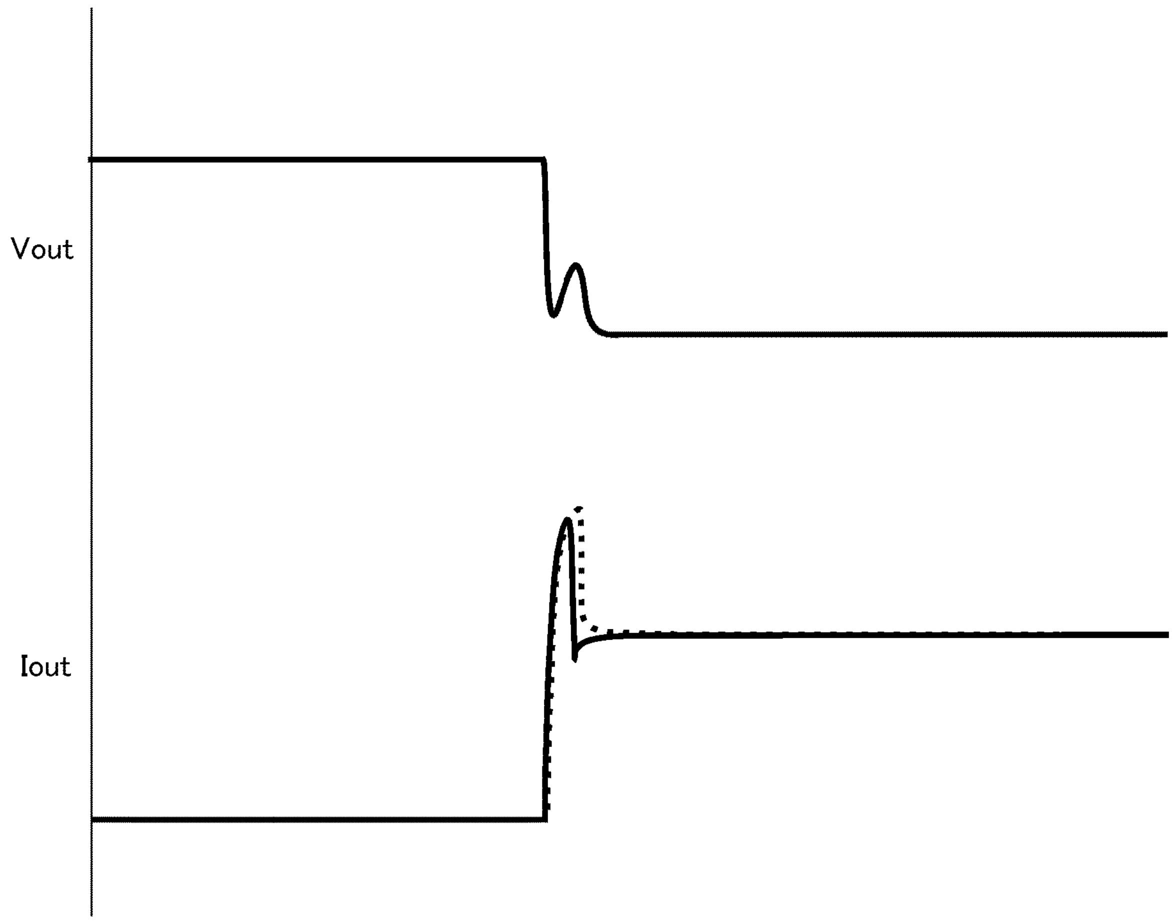
FIG. 4 is a diagram illustrating a behavior of peak current upon load variation.

FIG. 4 is a diagram illustrating a behavior of a peak current upon load variation, and in the figure, the output voltage Vout and the output current Iout are depicted in order from the top.

Note that a solid line of the output current Iout indicates a behavior of the output current Iout when a mirror current ratio Im1/Im2=2/1. On the other hand, a dotted line of the output current Iout indicates a behavior of the output current Iout when the mirror current ratio Im1/Im2=1/2.

As is clear from comparison between the solid line and the dotted line of the output current Iout, in the power supply device 1 of the present embodiment, by regulating the mirror current ratio Im1/Im2, it is possible to suppress transient peak current during overcurrent protection operation associated with load variation of the power supply device 1. On the other hand, a DC upper limit value (=overcurrent detection threshold value) of the output current Iout is constant regardless of the mirror current ratio Im1/Im2.

Figure 5:
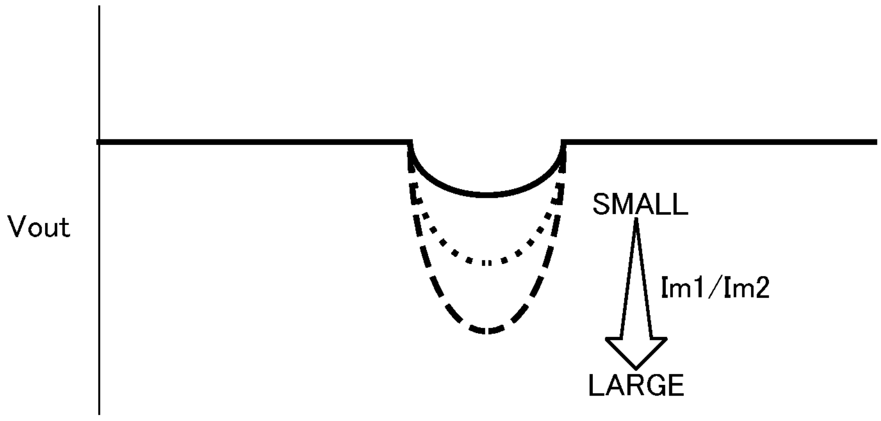
FIG. 5 is a diagram illustrating a relationship between mirror current ratio and load response characteristics.

FIG. 5 is a diagram showing a relationship between the mirror current ratio Im1/Im2 and the load response characteristics of the output voltage Vout. As is clear from comparison between a solid line (the mirror current ratio: small), a dotted line (the mirror current ratio: medium), and a dashed line (the mirror current ratio: large), as the mirror current ratio Im1/Im2 increases, the load response characteristics of the output voltage Vout becomes deteriorated, that is, output variation increases during load variation.

For example, in a case where the size ratio between the output transistors M1 and M2 is 1:2, erroneous operation can occur when Im1/Im2>5/10.

Figure 6:
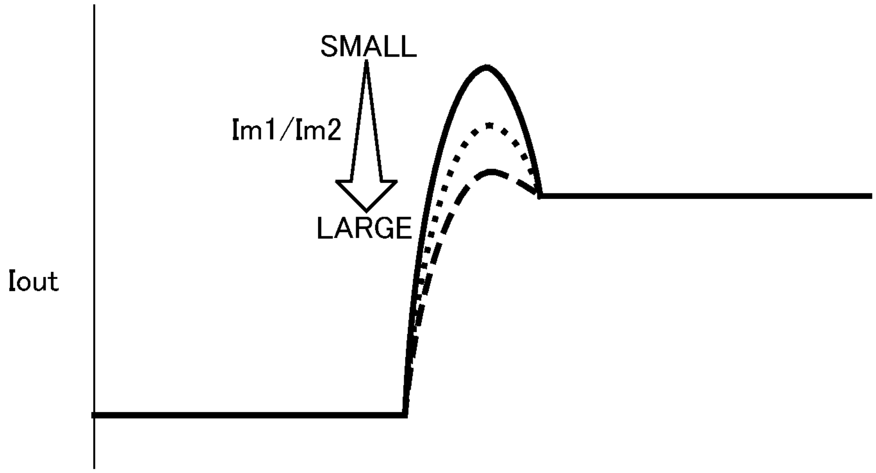
FIG. 6 is a diagram illustrating a relationship between mirror current ratio and peak current.

FIG. 6 is a diagram illustrating a relationship between the mirror current ratio Im1/Im2 and the peak current of the output current Iout. As is clear from comparison between a solid line (the mirror current ratio: small), a dotted line (the mirror current ratio: medium), and a dashed line (the mirror current ratio: large), as the mirror current ratio Im1/Im2 decreases, the peak current of the output current Iout increases, that is, it becomes impossible to suppress the peak current.

For example, in a case where the size ratio between the output transistors M1 and M2 is 1:2, erroneous operation can occur when Im1/Im2<2/10.

In light of the behaviors illustrated in FIG. 5 and FIG. 6, it is considered appropriate, for example, in the case where the size ratio between the output transistors M1 and M2 is 1:2, to set the mirror current ratio Im1/Im2 such that 2/8<Im1/Im2<4/6 holds.

Note that, in terms of design philosophy of the power supply device 1, it is desirable to first determine the size ratio between the output transistors M1 and M2 and the resistance value of the resistor R10 so as to optimize the phase characteristics and then set the mirror current ratio Im1/Im2 so as to suppress the peak current while improving the load response characteristics.

Power Supply Device (Second Embodiment)

Figure 7:
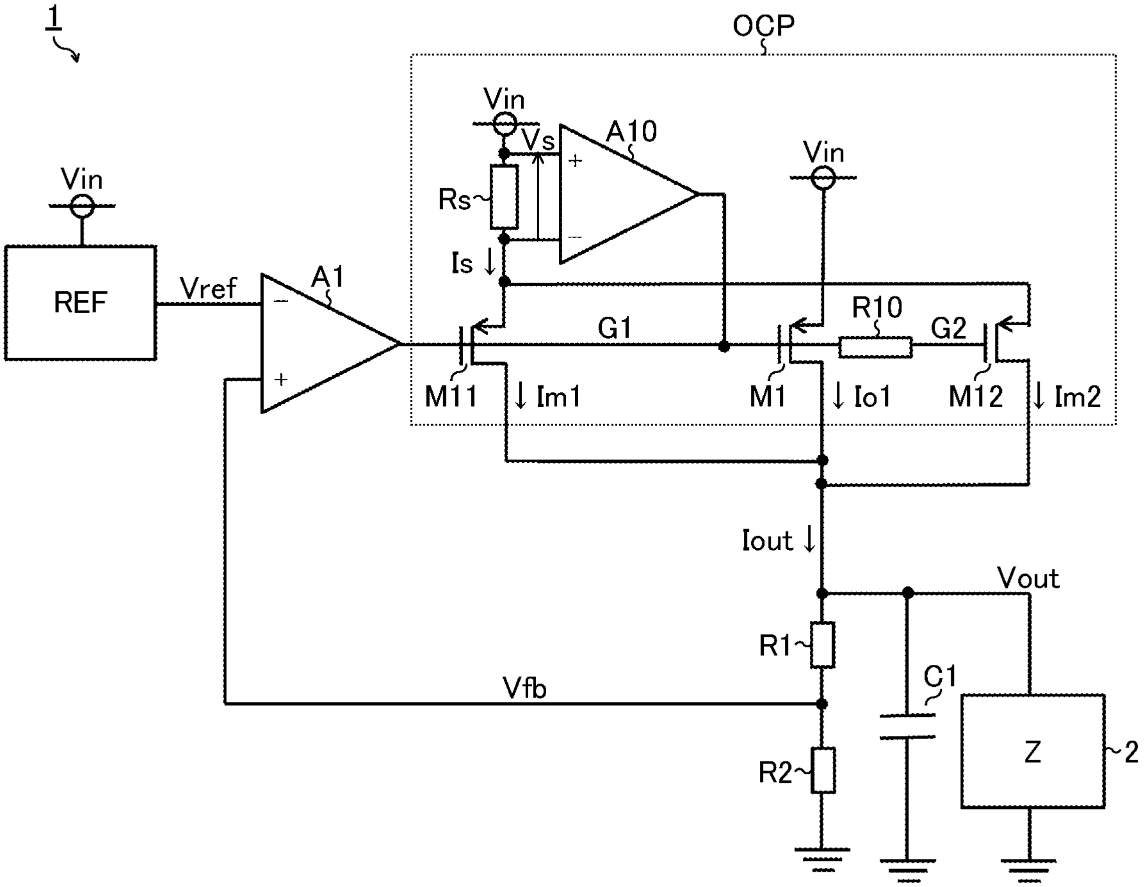
FIG. 7 is a diagram illustrating a power supply device according to a second embodiment.

FIG. 7 is a diagram illustrating a power supply device 1 according to a second embodiment. The power supply device 1 of the present embodiment basically has the same configuration as the previously described first embodiment (FIG. 2), but the output transistor M2 is omitted.

Thus, to suppress the peak current while improving the load response characteristics, what is important is to divide the mirror transistor of the overcurrent protection circuit OCP into a plurality of mirror transistors, and it is not necessarily essential to divide the output transistor.

Overview

What follows is an overview of the various embodiments disclosed above.

For example, an overcurrent protection circuit disclosed herein includes a first mirror transistor configured to be driven by a first drive signal, common to a first output transistor, so as to pass a first mirror current, a second mirror transistor configured to be driven by a second drive signal so as to pass a second mirror current, a resistor configured to be connected between a control terminal of each of the first output transistor and the first mirror transistor and a control terminal of the second mirror transistor, and a current restriction unit configured to control the first drive signal such that a sense current, which is a total of the first mirror current and the second mirror current, is restricted to values equal to or less than a predetermined upper limit value (a first configuration).

Here, in the overcurrent protection circuit having the first configuration described above, the current restriction unit may be configured to include a sense resistor configured to convert the sense current to a sense voltage and an operational amplifier configured to regulate the first drive signal in accordance with the sense voltage (a second configuration).

Further, in the overcurrent protection circuit having the first or second configuration described above, the first mirror transistor and the second mirror transistor may be smaller in size than the first output transistor (a third configuration).

Further, in the overcurrent protection circuit having any one of the first to third configurations described above, the resistor may have a resistance value of several tens to several hundreds kΩ (a fourth configuration).

Further, for example, a power supply device disclosed herein is configured to include the first output transistor configured to be connected between an input terminal for an input voltage and an output terminal for an output voltage so as to be driven by the first drive signal, an output feedback circuit configured to generate the first drive signal in accordance with a difference between the output voltage, or a feedback voltage in accordance with the output voltage, and a predetermined reference voltage, and the overcurrent protection circuit having any one of the first to fourth configurations described above (a fifth configuration).

Here, the power supply device having the fifth configuration described above may further be configured to include a second output transistor configured to be connected between the input terminal for the input voltage and the output terminal for the output voltage so as to be driven by the second drive signal (a sixth configuration).

In the power supply device having the sixth configuration described above, the second output transistor may be larger in size than the first output transistor (a seventh configuration).

The power supply device having the seventh configuration described above may be configured such that a size ratio between the first output transistor and the second output transistor is 1:2 (an eighth configuration).

The power supply device having the eighth configuration described above may be configured such that 2/8<Im1/Im2<4/6 holds, where Im1 and Im2 respectively represents the first mirror current and the second mirror current in a steady state (a ninth configuration).

In the power supply device having any one of the fifth to ninth configurations described above, the output feedback circuit may be configured to include an error amplifier configured to generate the first drive signal in accordance with the difference between the output voltage or the feedback voltage and the reference voltage (a tenth configuration).

With the disclosure herein, it is possible to provide an overcurrent protection circuit and a power supply device which are capable of suppressing a peak current while improving load response characteristics.

Further Modifications

The various technical features disclosed herein may be implemented in any other manners than in the embodiments described above, and allow for any modifications made without departure from their technical ingenuity. For example, bipolar and MOS field-effect transistors may be interchanged and logic levels of various signals may be inverted as necessary. That is, it should be understood that the above embodiments are illustrative in all respects and are not intended to limit the present disclosure, that the technological scope of the present disclosure is indicated by the claims, and that all modifications within the scope of the claims and the meaning equivalent to the claims are covered.

The invention claimed is:

1. An overcurrent protection circuit, comprising:

a first mirror transistor configured to be driven by a first drive signal, common to a first output transistor, so as to pass a first mirror current;

a second mirror transistor configured to be driven by a second drive signal so as to pass a second mirror current;

a resistor, wherein a first end of the resistor is connected to a control terminal of the first output transistor and to a control terminal of the first mirror transistor, and a second end of the resistor is connected to a control terminal of the second mirror transistor, so as to delay rising and falling of the second drive signal compared to rising and falling of the first drive signal; and a current restriction unit configured to control the first drive signal such that a sense current, which is a total of the first mirror current and the second mirror current, is restricted to values equal to or less than a predetermined upper limit value.

2. The overcurrent protection circuit according to claim 1, wherein the current restriction unit includes:

a sense resistor configured to convert the sense current to a sense voltage; and an operational amplifier configured to regulate the first drive signal in accordance with the sense voltage.

3. The overcurrent protection circuit according to claim 1, wherein the first mirror transistor and the second mirror transistor are smaller in size than the first output transistor.

4. The overcurrent protection circuit according to claim 1, wherein the resistor has a resistance value of several tens to several hundreds kΩ.

5. A power supply device, comprising:

the first output transistor configured to be connected between an input terminal for an input voltage and an output terminal for an output voltage so as to be driven by the first drive signal;

an output feedback circuit configured to generate the first drive signal in accordance with a difference between the output voltage, or a feedback voltage in accordance with the output voltage, and a predetermined reference voltage; and the overcurrent protection circuit according to claim 1.

6. The power supply device according to claim 5, further comprising:

a second output transistor configured to be connected between the input terminal for the input voltage and the output terminal for the output voltage so as to be driven by the second drive signal.

7. The power supply device according to claim 6, wherein the second output transistor is larger in size than the first output transistor.

8. The power supply device according to claim 7, wherein a size ratio between the first output transistor and the second output transistor is 1:2.

9. The power supply device according to claim 8, wherein $2/8 < Im1/Im2 < 4/6$ holds, where Im1 and Im2 respectively represent the first mirror current and the second mirror current in a steady state.

10. The power supply device according to claim 5, wherein the output feedback circuit includes an error amplifier configured to generate the first drive signal in accordance with the difference between the output voltage or the feedback voltage and the reference voltage.

* * * * *